(12) United States Patent
Lin et al.

(10) Patent No.: US 8,295,658 B2
(45) Date of Patent: Oct. 23, 2012

(54) OPTICAL FIBER CONNECTOR

(75) Inventors: I-Thun Lin, Taipei Hsien (TW);
Tai-Cherng Yu, Taipei Hsien (TW);
Sheng-Jung Yu, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 174 days.

(21) Appl. No.: 12/855,718

(22) Filed: Aug. 13, 2010

(65) Prior Publication Data

US 2011/0135253 A1 Jun. 9, 2011

(30) Foreign Application Priority Data

Dec. 7, 2009 (CN) .......................... 2009 1 0311013

(51) Int. Cl.
*G02B 6/12* (2006.01)
*G02B 6/26* (2006.01)

(52) U.S. Cl. ........................................... 385/14; 385/27

(58) Field of Classification Search .................... 386/14, 386/27
See application file for complete search history.

(56) References Cited

U.S. PATENT DOCUMENTS

| | | | | |
|---|---|---|---|---|
| 5,381,495 | A | * | 1/1995 | Hu ................................. 385/51 |
| 5,760,711 | A | * | 6/1998 | Burns ........................... 340/962 |
| 6,052,056 | A | * | 4/2000 | Burns et al. ................... 340/583 |
| 7,933,012 | B2 | * | 4/2011 | Hartmann et al. ............. 356/246 |
| 2005/0084205 | A1 | * | 4/2005 | Hong et al. ..................... 385/22 |
| 2009/0147253 | A1 | * | 6/2009 | Hartmann et al. ............. 356/246 |
| 2009/0252459 | A1 | * | 10/2009 | Nielson et al. .................. 385/79 |
| 2009/0324175 | A1 | * | 12/2009 | Everett et al. ................... 385/72 |

* cited by examiner

*Primary Examiner* — K. Cyrus Kianni
(74) *Attorney, Agent, or Firm* — Altis Law Group, Inc.

(57) ABSTRACT

An exemplary optical fiber connector includes a housing, and two lenses. The housing defines two first blind holes each configured for receiving an optical fiber. The two lenses are formed on the housing and each of the lenses is aligned with a corresponding first blind hole. The two second blind holes are defined on the housing and each of the second blind hole run through the housing to the bottom of a corresponding first blind hole allowing glue to accumulate on the bottom of the first blind hole.

5 Claims, 5 Drawing Sheets

OPTICAL FIBER CONNECTOR

BACKGROUND

1. Technical Field

The present disclosure relates to optical fiber connectors.

2. Description of Related Art

Optical fiber connectors typically include a blind hole behind a lens. The blind hole is used to receive an optical fiber. Since the evenness of the tip of the optical fiber may not perfectly match the evenness of the bottom of the blind hole, air gap(s) may exist between the tip of the optical fiber and the bottom of the blind hole after the optical fiber is inserted into the blind hole. This decreases the efficiency of the optical signal transmission between the lens and the optical fiber.

Therefore, an optical fiber connector which can overcome the above-mentioned problems is needed.

DETAILED DESCRIPTION

Figure 1:
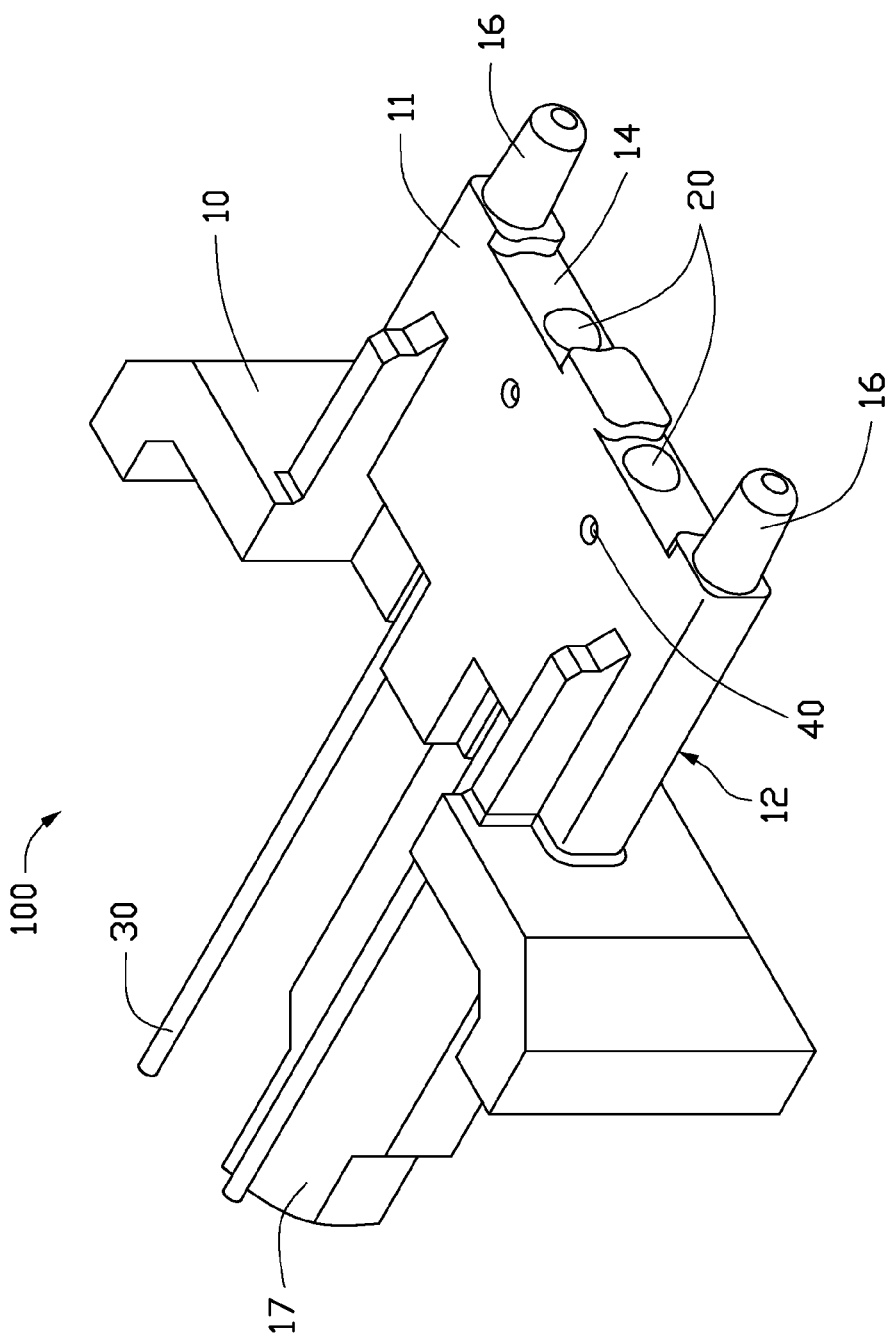
FIG. 1 is an isometric and schematic view of an optical fiber connector according to an exemplary embodiment.
Figure 2:
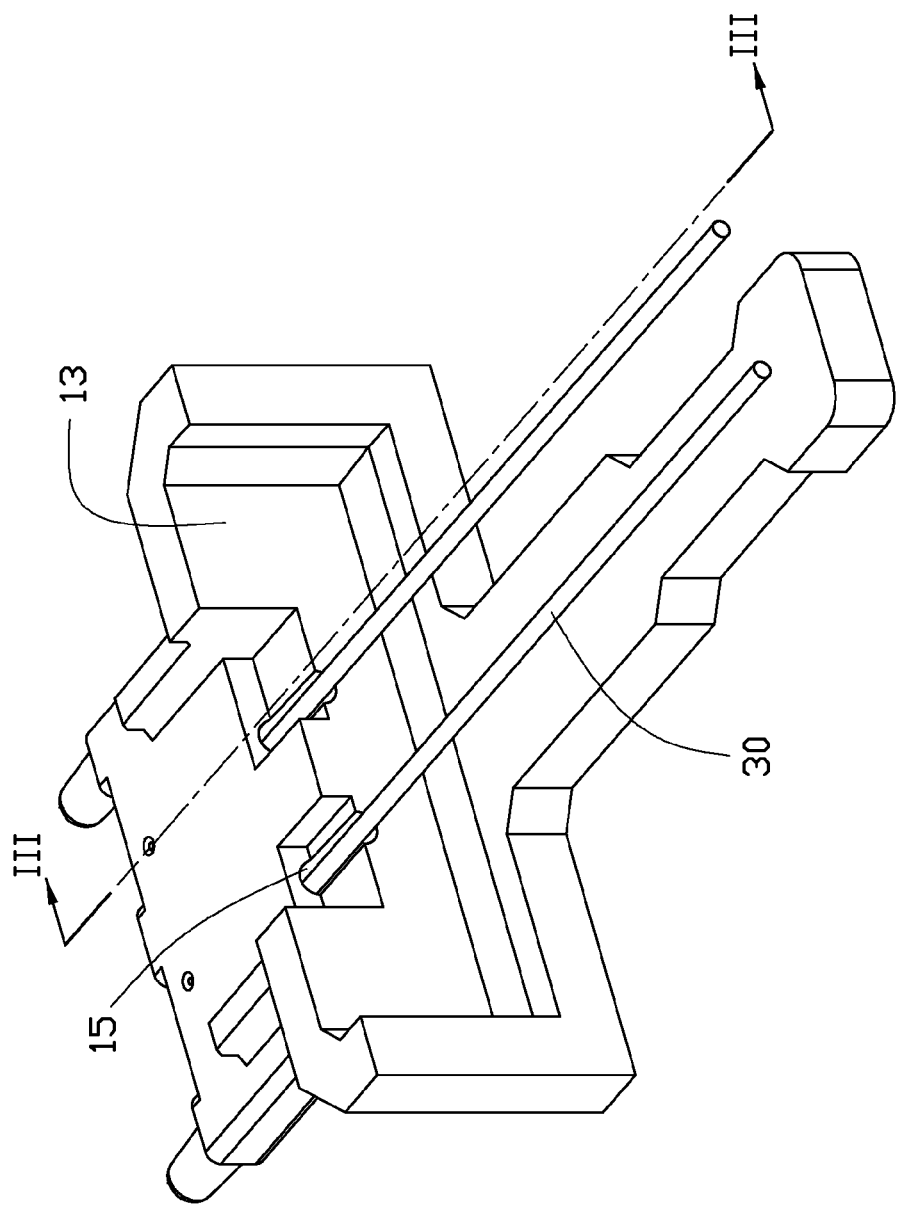
FIG. 2 is similar to FIG. 1, but viewing the optical fiber connector from another angle.
Figure 3:
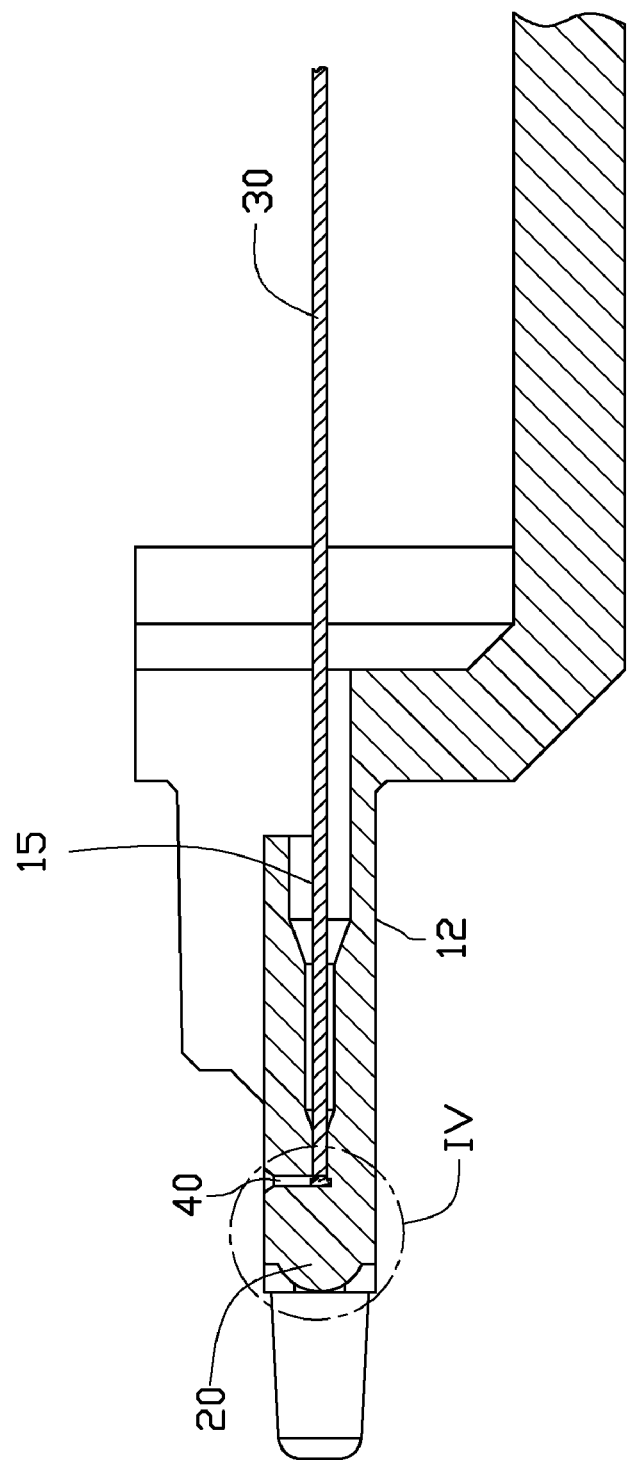
FIG. 3 is a sectional view taken along line III-III of the optical fiber connector of FIG. 2.
Figure 4:
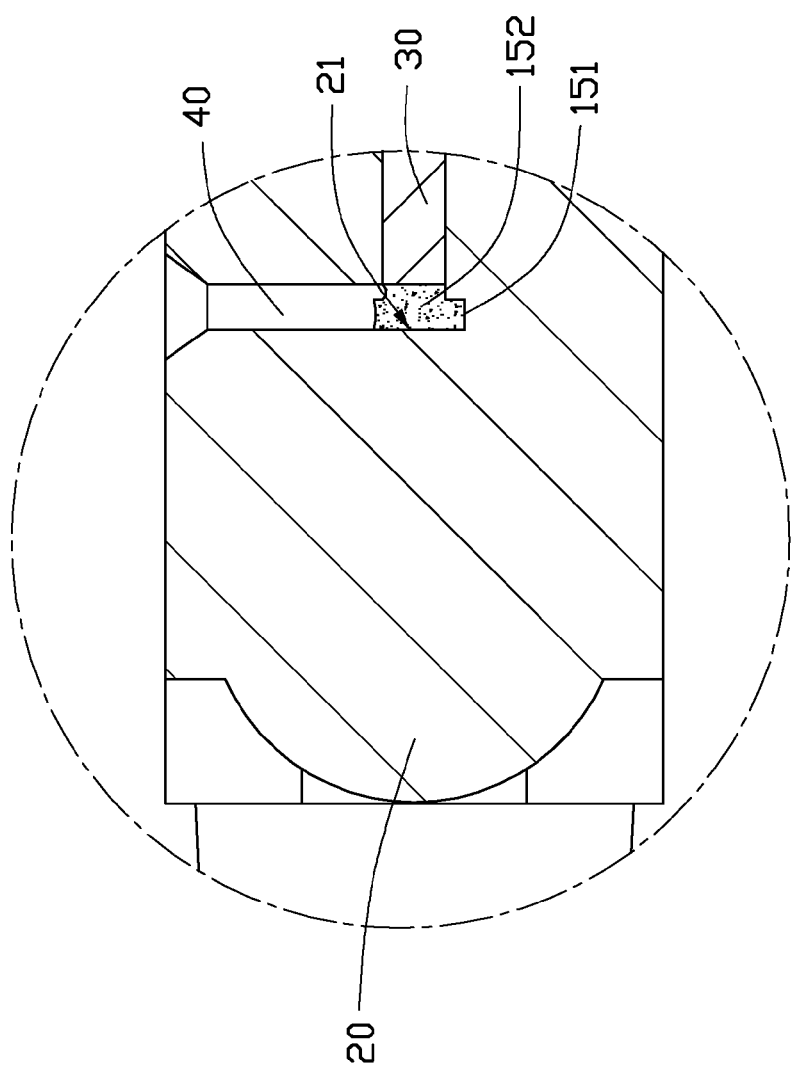
FIG. 4 is an enlarged view of the part IV of the optical fiber connector of FIG. 3.

Referring to FIGS. 1 to 4, an optical fiber connector 100, according to an exemplary embodiment, includes a housing 10, two lenses 20 and two optical fiber 30.

The housing 10 includes a first surface 11, a second surface 12 opposite to the first surface 11, a third surface 13 and a fourth surface 14 opposite to the third surface 13. The first surface 11 is substantially parallel to the second surface 12. The third surface 13 and the fourth surface 14 respectively connect to the first surface 11 and the second surface 12.

The housing 10 defines two parallel first blind holes 15 for receiving the optical fibers 30. Each first blind hole 15 extends from the third surface 13 to the fourth surface 14. It is to be understood that in alternative embodiments, the number of the first blind holes 15 may be different and depends on the practical uses of the optical fiber connector 100.

Each the first blind hole 15 further defines a cylindrical bottom portion 151 used to contain an adhesive 152. The central axis of each cylindrical bottom portion 151 coincides with that of the corresponding first blind hole 15 and the diameter of each cylindrical bottom portion 151 is greater than that of the corresponding first blind hole 15. It is to be understood that in alternative embodiments, the central axis of the bottom portion 151 may not coincide with the central axis of the blind hole 15, and the bottom portion 151 may be formed in other shapes, and the diameter of each cylindrical bottom portion 151 may equal that of the corresponding first blind hole 15.

Each lens 20 is integrally formed with the housing 10 on the fourth surface 14 and optically coupled with a corresponding first blind hole 15. Each lens 20 has a lens surface 21 exposed at the cylindrical bottom portion 151 of the first blind hole 15. An optical axis of each lens 20 coincides with a central axis of the corresponding first blind hole 15. In this embodiment, two plugs 16 protrude from the fourth surface 14 and are configured for fixing the optical fiber connector 100 while the optical fiber connector 100 is being used.

Corresponding to each first blind hole 15, the housing 10 defines a second blind hole 40 in the first surface 11. The second blind holes 40 run through the housing 10 from the first surface 11 to the corresponding cylindrical bottom portion 151. The second blind holes 40 are used to allow the adhesive 152 to enter the cylindrical bottom portion 151, thereby attaching the optical fibers 30 into the first blind holes 15. The adhesive 152 has a refraction index the same as that of the housing 10. The central axes of the second blind holes 40 substantially perpendicular to the central axes of the first blind holes 15. It is to be understood that in alternative embodiments, the central axes of the second blind holes 40 may be not perpendicular to the central axis of the first blind hole 15 and the refraction index of the adhesive 152 may be different with that of the housing 10.

In the present embodiment, the second blind holes 40 are formed to be funnel-shaped to match an injection head in the manufacturing process of the optical fiber connector 100. It is to be understood that in alternative embodiments, the second blind holes 40 may be formed as other shapes such as a cube or cylinder.

During the assembly of the optical fiber connector 100, the adhesive 152 is first placed into the cylindrical bottom portion 151 through the second blind holes 40, and then the optical fibers 30 are inserted into the first blind holes 15 and further inserted into the adhesive 152 accumulated within the cylindrical bottom portion 151. By applying pressure on the optical fibers 30, the adhesive 152 can be adequately filled between the tips of the optical fibers 30 and the lens surface 21 of the lens 20 to eliminate air gap(s) between the tips of the optical fibers and the lens surface 21 of the lens 20. In this way, the present optical fiber connector 100 can greatly increase the efficiency of optical signal transmission between the lenses 20 and the optical fibers 30.

Figure 5:
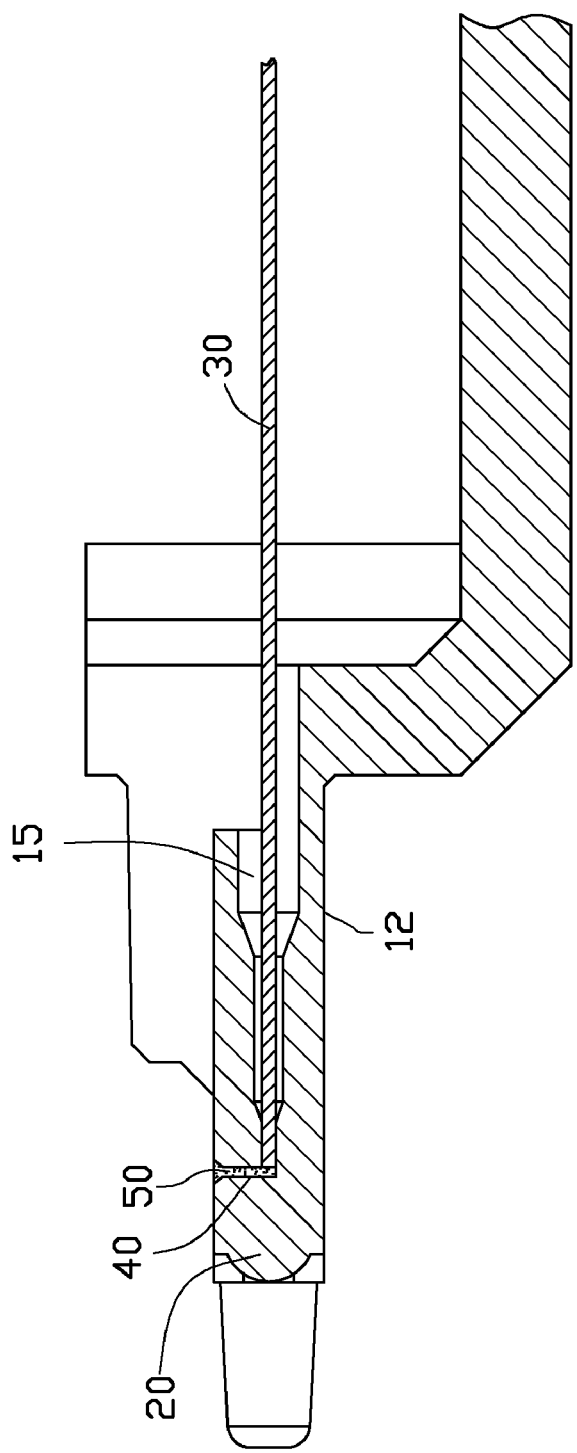
FIG. 5 is a sectional view of an optical fiber connector according to another exemplary embodiment.

Referring to FIG. 5, in alternative embodiments, the diameter of each cylindrical bottom portion 151 equal with that of the corresponding first blind hole 15, and further, the second blind holes 40 are filled by a filling member 50 after finishing the assembly of the optical fiber connector 100. In the embodiment described by the FIG. 5, the filling member 50 is the adhesive 152. It is to be understood that in alternative embodiments, the filling member 50 may be other things such as the material the same as that of the housing 10.

The housing 10 further includes a grip 17 protruding from the third surface 13. When the optical fiber connector 100 is used, the optical fiber connector 100 can be assembled into an electronic device such as a notebook or a digital camera by griping the grip 17.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector, comprising:
   an optical fiber;
   a housing defining a first blind hole receiving the optical fiber and a second blind hole, the second blind hole distinctly oriented from the first blind hole and running to a bottom portion of the first blind hole, the bottom portion being cylindrical, the central axis of the bottom portion coinciding with that of the first blind hole and the diameter of the bottom portion being greater than that of the first blind hole, the bottom portion being configured for containing adhesive;

a lens formed in the housing and aligned with the first blind hole, the lens having a lens surface exposed at the bottom portion of the first blind hole; and an adhesive applied in the bottom portion of the first blind hole between the lens surface and the optical fiber; wherein the second blind hole is configured to introduce the adhesive to the bottom portion of the first blind hole.

2. The optical fiber connector of claim 1, wherein the first blind hole is substantially perpendicular to the second blind hole.

3. The optical fiber connector of claim 2, further comprising a filling member filling the second blind hole.

4. The optical fiber connector of claim 2, wherein the lens is integrally formed with the housing.

5. The optical fiber connector of claim 1, wherein the second blind hole is substantially funnel-shaped.

* * * * *